(12) United States Patent
Yamamoto et al.

(10) Patent No.: US 9,327,177 B2
(45) Date of Patent: May 3, 2016

(54) TENNIS SWING ANALYSIS METHOD

(75) Inventors: Yosuke Yamamoto, Kobe (JP); Hironori Takihara, Kobe (JP); Kuniyasu Horiuchi, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 875 days.

(21) Appl. No.: 13/539,754

(22) Filed: Jul. 2, 2012

(65) Prior Publication Data

US 2013/0095962 A1 Apr. 18, 2013

(30) Foreign Application Priority Data

Oct. 14, 2011 (JP) ................................. 2011-226495

(51) Int. Cl.
| | |
|---|---|
| A63B 69/00 | (2006.01) |
| A63B 69/38 | (2006.01) |
| A63B 59/00 | (2015.01) |
| A63B 59/04 | (2006.01) |
| A63B 49/00 | (2015.01) |
| A63B 49/02 | (2015.01) |
| A63B 49/16 | (2006.01) |

(52) U.S. Cl.
CPC ..................................... *A63B 69/38* (2013.01)

(58) Field of Classification Search
CPC ....................................................... A63B 69/38
See application file for complete search history.

(56) References Cited

U.S. PATENT DOCUMENTS

| | | | | |
|---|---|---|---|---|
| 5,226,650 | A  * | 7/1993 | Suttner | .................. A63B 69/38 473/463 |
| 7,602,301 | B1 | 10/2009 | Stirling et al. | |
| 2003/0024311 | A1* | 2/2003 | Perkins | ........................... 73/493 |
| 2004/0259651 | A1 | 12/2004 | Storek | |
| 2005/0054457 | A1 | 3/2005 | Eyestone et al. | |
| 2005/0261073 | A1 | 11/2005 | Farrington, Jr. et al. | |
| 2007/0129909 | A1* | 6/2007 | Kusuda et al. | ................. 702/141 |

FOREIGN PATENT DOCUMENTS

| | | |
|---|---|---|
| JP | 2002-126147 A | 5/2002 |
| JP | 2006-263340 A | 10/2006 |
| JP | 2009-125499 A | 6/2009 |

* cited by examiner

*Primary Examiner* — Kevin Y Kim
(74) *Attorney, Agent, or Firm* — Birch, Stewart, Kolasch & Birch, LLP

(57) ABSTRACT

A swing analyzing apparatus includes: a three-axis acceleration sensor attached to a tennis racket, for measuring accelerations in the directions of three axes when a swing for hitting a tennis ball is taken with the tennis racket; a three-axis gyro sensor attached to the tennis racket, for measuring angular speeds about the three axes; and an analyzing device. The analyzing device has a receiving function to receive data regarding the accelerations and the angular speeds from the three-axis acceleration sensor and the three-axis gyro sensor; a coordinate axis conversion function to convert relative coordinate axes that are the three axes for the accelerations into absolute coordinate axes on the basis of the angular speeds; and a calculation function to calculate an index of the swing on the basis of accelerations resulting from the coordinate axis conversion.

13 Claims, 7 Drawing Sheets

US 9,327,177 B2

TENNIS SWING ANALYSIS METHOD

This application claims priority on Patent Application No. 2011-226495 filed in JAPAN on Oct. 14, 2011. The entire contents of this Japanese Patent Application are hereby incorporated by reference.

BACKGROUND OF THE INVENTION

1. Field of the Invention

The present invention relates to methods for analyzing tennis swing and apparatuses used for performing the methods.

2. Description of the Related Art

Swing in tennis is different from player to player. Swing is influenced by the specifications of a tennis racket. For example, when a player attempts to hit a ball with a racket having a low resilience coefficient to obtain a high speed, the player tenses themselves. Meanwhile, when a player attempts to control the speed of a ball in hitting the ball with a racket having an excessively high resilience coefficient, the player loosens their hand. Matching between a player and a racket is important. Appropriate swing analysis allows for accurate fitting. Appropriate swing analysis can contribute to improvement in player's skill.

Swing analysis can also contribute to research and development for tennis rackets. Further, swing analysis can contribute to promotion of rackets.

JP2002-126147 discloses an apparatus in which images of a swing are captured by three high-speed cameras and the behavior of a racket is analyzed on the basis of the obtained images.

JP2006-263340 discloses a swing speed measuring method. In this method, a magnet is attached to the head-side end of a racket. A sensor detects passage of the magnet, whereby a swing speed can be calculated.

JP2009-125499 discloses a method in which a three-axis acceleration sensor and a three-axis gyro sensor are used to analyze a swing.

The measuring apparatus disclosed in JP2002-126147 is large in size and complicated. Such a measuring apparatus is not suitable to fitting in a tennis clubhouse or the like.

In the method disclosed in JP2006-263340, a swing speed can be measured only for a practice swing. By this method, the speed of a swing for hitting a tennis ball cannot be measured.

In the method disclosed in JP2009-125499, it is not clear how each sensor is used.

SUMMARY OF THE INVENTION

An object of the present invention is to provide an apparatus which can accurately analyze a swing and a method for analyzing a swing by using the apparatus.

A tennis swing analyzing apparatus according to the present invention includes:

(1) a three-axis acceleration sensor attached to a tennis racket including a grip and a head, for measuring accelerations in directions of three axes when a swing for hitting a tennis ball is taken with the tennis racket;

(2) a three-axis gyro sensor attached to the tennis racket, for measuring angular speeds about the three axes when the swing for hitting is taken; and (3) an analyzing device.

The analyzing device (3) has:

(3-1) a receiving function to receive data regarding the accelerations and the angular speeds from the three-axis acceleration sensor and the three-axis gyro sensor;

(3-2) a coordinate axis conversion function to convert relative coordinate axes that are the three axes for the accelerations into absolute coordinate axes on the basis of the angular speeds; and (3-3) a calculation function to calculate an index of the swing on the basis of accelerations resulting from the coordinate axis conversion.

The index is preferably a grip speed, a head speed, a head speed component ratio, or a swing trajectory. The index is particularly preferably the grip speed, the head speed, or the head speed component ratio immediately before an impact of the tennis racket against the tennis ball.

The three-axis acceleration sensor and the three-axis gyro sensor are preferably attached to an end of the grip.

The analyzing device further has:

(3-4) a calculation function to calculate the head speed, the head speed component ratio, or the swing trajectory on the basis of the grip speed.

According to another aspect, a tennis swing analysis method according to the present invention includes the steps of:

measuring accelerations in directions of three axes by a three-axis acceleration sensor and measuring angular speeds about the three axes by a three-axis gyro sensor when a swing for hitting a tennis ball is taken with a tennis racket that includes a grip and a head and to which the three-axis acceleration sensor and the three-axis gyro sensor are attached;

converting relative coordinate axes that are the three axes for the accelerations into absolute coordinate axes on the basis of the angular speeds; and calculating an index of the swing by an analyzing device on the basis of accelerations resulting from the coordinate axis conversion.

The index is preferably a grip speed, a head speed, a head speed component ratio, or a swing trajectory. The index is particularly preferably the grip speed, the head speed, or the head speed component ratio immediately before an impact of the tennis racket against the tennis ball.

Preferably, the analysis method further includes the step of calculating the head speed, the head speed component ratio, or the swing trajectory on the basis of the grip speed.

In a fitting method according to the present invention, the above-described analysis method is used.

The fitting method includes the step of:

determining suitability of the tennis racket on the basis of the index.

The fitting method according to the present invention preferably includes the step of:

displaying, on a display section, a graph in which a vertical axis indicates a head speed component and a horizontal axis indicates another head speed component.

The fitting method according to the present invention preferably includes the step of:

categorizing a swing type on the basis of a head speed component ratio.

DESCRIPTION OF THE PREFERRED EMBODIMENTS

The following will describe in detail the present invention, based on preferred embodiments with reference to the accompanying drawings.

Figure 1:
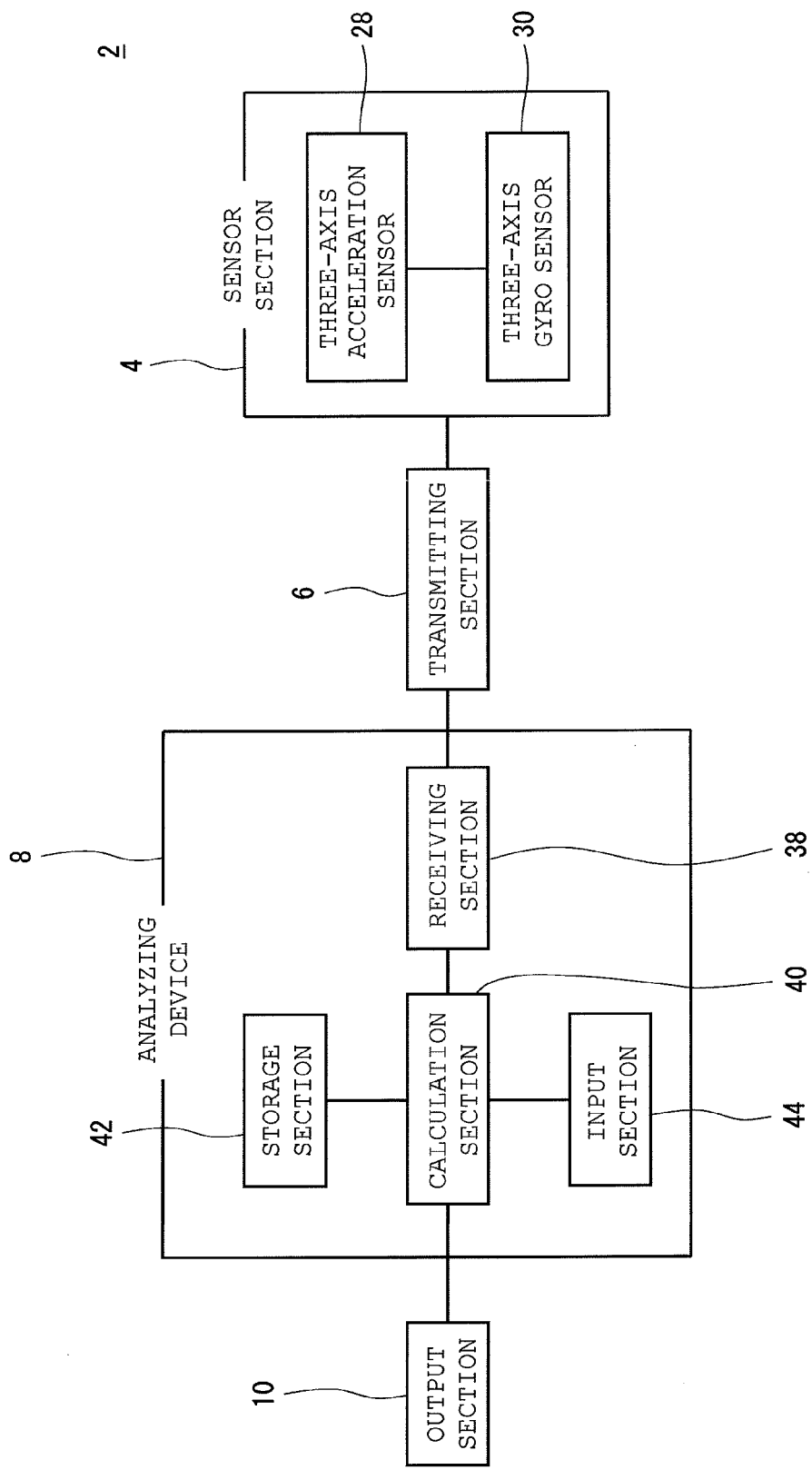
FIG. 1 is a conceptual diagram of a tennis swing analyzing apparatus according to one embodiment of the present invention.
Figure 2:
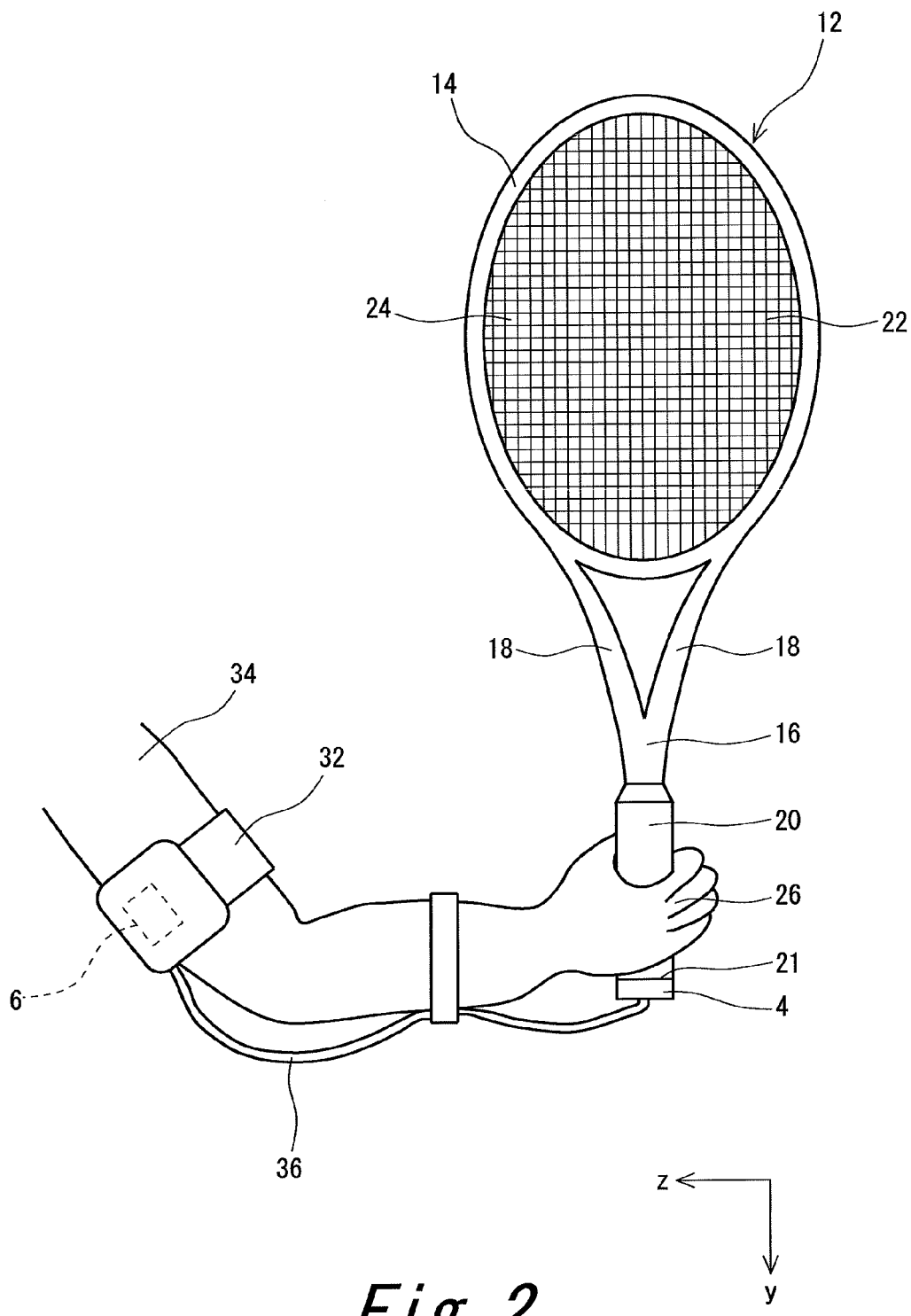
FIG. 2 is a front view showing a sensor section and a transmitting section of the analyzing apparatus in FIG. 1 with a tennis racket.

A tennis swing analyzing apparatus 2 shown in FIGS. 1 and 2 includes a sensor section 4, a transmitting section 6, an analyzing device 8, and an output section 10. FIG. 2 shows a portion of the analyzing apparatus 2 with a tennis racket 12. The tennis racket 12 includes a head 14, a shaft 16, a pair of throats 18 extending from the head 14 to the shaft 16, and a grip 20 connected to the shaft 16. The racket 12 also includes a gut 22 stretched laterally and longitudinally on the head 14. By the gut 22, a face 24 is formed.

In FIG. 2, the grip 20 is held with the right hand 26 of a player. As shown in FIG. 2, the longitudinal direction of the shaft 16 coincides with the direction of a y-axis. The direction of the y-axis is parallel to the face 24. The direction from the head 14 toward the grip 20 is the positive direction of the y-axis. The direction of a z-axis is also parallel to the face 24. The z-axis is orthogonal to the y-axis. When the face 24 shown in FIG. 2 is regarded as the dial of a clock, the direction from the position of three toward the position of nine is the positive direction of the z-axis. Although not shown in FIG. 2, the direction of an x-axis is perpendicular to the face 24. The x-axis is orthogonal to the y-axis and also orthogonal to the z-axis. With regard to the thickness direction of the head 14, the direction from the back side toward the front side is the positive direction of the x-axis. The front side is a side that contacts a tennis ball when a forehand stroke is made. The x-axis, the y-axis, and the z-axis are axes based on the racket 12. A coordinate (x, y, z) defined by these axes is a coordinate based on the racket 12. The directions of the x-axis, the y-axis, and the z-axis vary in accordance with the attitude of the racket 12. The x-axis, the y-axis, and the z-axis are relative coordinate axes. A coordinate (x, y, z) defined by these axes is a relative coordinate.

As is obvious from FIG. 2, the sensor section 4 is attached to an end 21 of the grip 20. The sensor section 4 at this position does not hamper a swing of the player. As shown in FIG. 1, the sensor section 4 includes a three-axis acceleration sensor 28 and a three-axis gyro sensor 30.

The three-axis acceleration sensor 28 can measure accelerations in the x-axis direction, the y-axis direction, and the z-axis direction at a relative coordinate. The three-axis gyro sensor 30 can measure angular speeds about the x-axis, the y-axis, and the z-axis at a relative coordinate.

As shown in FIG. 2, the transmitting section 6 is fixed to an upper arm 34 by a band 32. The transmitting section 6 at this position does not hamper a swing of the player. The sensor section 4 and the transmitting section 6 are connected to each other via a cable 36. The transmitting section 6 receives data measured by the three-axis acceleration sensor 28 and the three-axis gyro sensor 30, from the sensor section 4 via the cable 36. The transmitting section 6 wirelessly transmits the data to the analyzing device 8. It should be noted that a battery (not shown) for driving the sensor section 4 and the transmitting section 6 is also fixed to the upper arm 34 by the band 32.

The analyzing device 8 includes a receiving section 38, a calculation section 40, a storage section 42, and an input section 44. The receiving section 38 receives data transmitted wirelessly from the transmitting section 6. The receiving section 38 transmits the data to the calculation section 40. The calculation section 40 is typically a CPU of a computer. The calculation section 40 causes the storage section 42 to store the data therein. Further, the calculation section 40 performs various calculations based on the data and also causes the storage section 42 to store results of the calculations therein. As the storage section 42, a RAM may be used or a hard disk may be used. As the storage section 42, an external storage medium may also be used.

The output section 10 is typically a monitor. The calculation section 40 causes the output section 10 to display results of measurements or results of calculations. A printer, a plotter, or the like may be used as the output section 10. Among the results of measurements or the results of calculations, only a result selected through an operation on the input section 44 may be outputted to the output section 10. Examples of the input section 44 include a keyboard, a mouse, and a touch panel.

Figure 3:
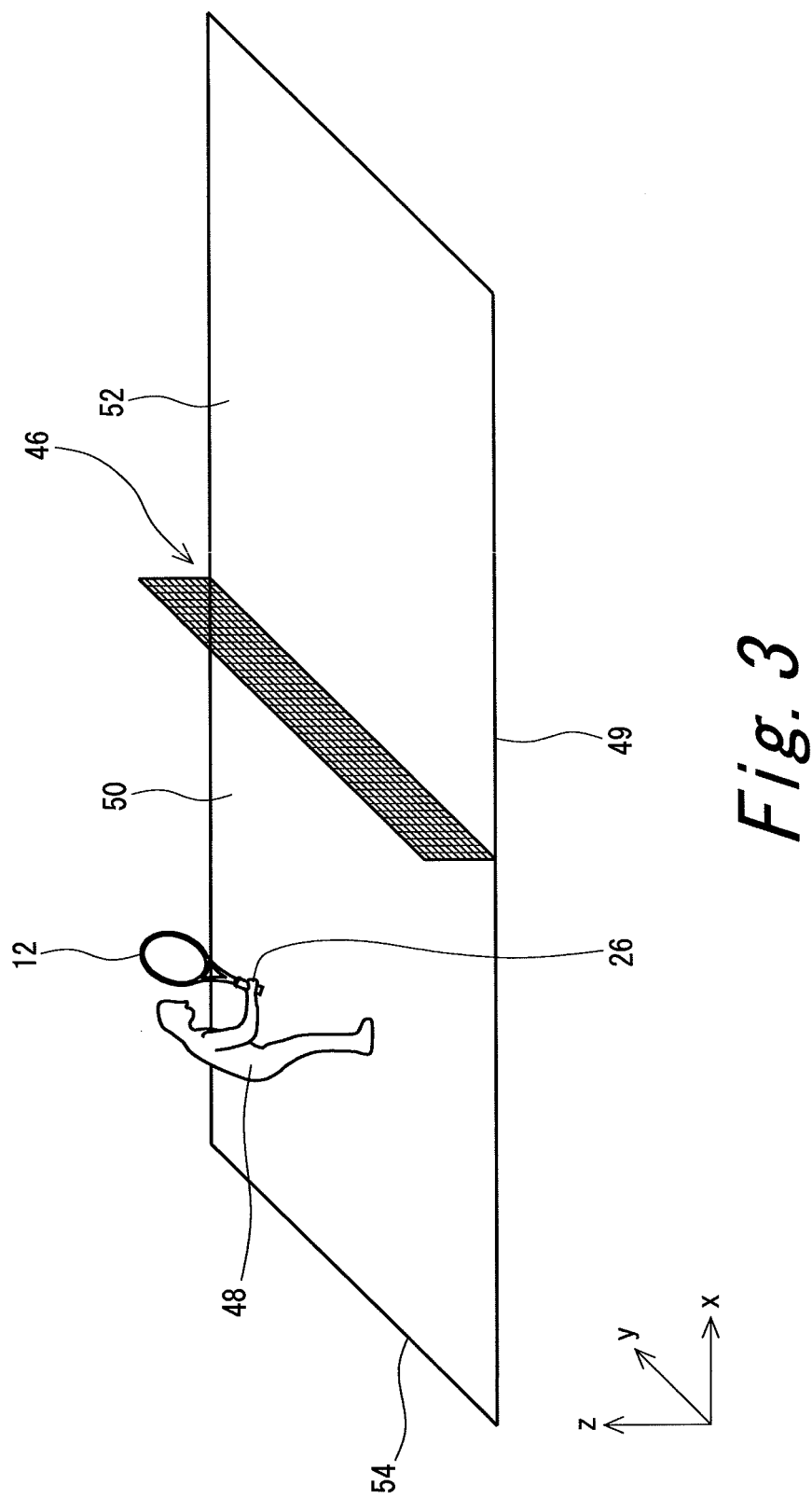
FIG. 3 is a perspective view of a tennis court in which a swing analysis method using the apparatus in FIG. 1 is performed.

FIG. 3 is a perspective view of a tennis court 46 in which a swing analysis method using the apparatus 2 in FIG. 1 is performed. FIG. 3 shows a player 48 who takes a swing. The player 48 is a right-handed player. The player 48 holds the racket 12 with the right hand 26. The player 48 makes a forehand ground stroke with the right hand 26.

As shown in FIG. 3, the direction along a sideline 49 of the tennis court 46 coincides with the direction of an x-axis. The direction from an own side 50 for the player 48 to an opponent's side 52 is the positive direction of the x-axis. The direction along an end line 54 of the tennis court 46 coincides with the direction of a y-axis. The direction from right toward left for the player 48 who faces the opponent's side 52 is the positive direction of the y-axis. The direction of a z-axis is the vertical direction. The upward direction is the positive direction of the z-axis. The x-axis, the y-axis, and the z-axis are axes based on the tennis court 46. In other words, the x-axis, the y-axis, and the z-axis are axes based on the ground surface. The x-axis, the y-axis, and the z-axis are absolute coordinate axes. A coordinate (x, y, z) defined by these axes is an absolute coordinate.

Figure 4:
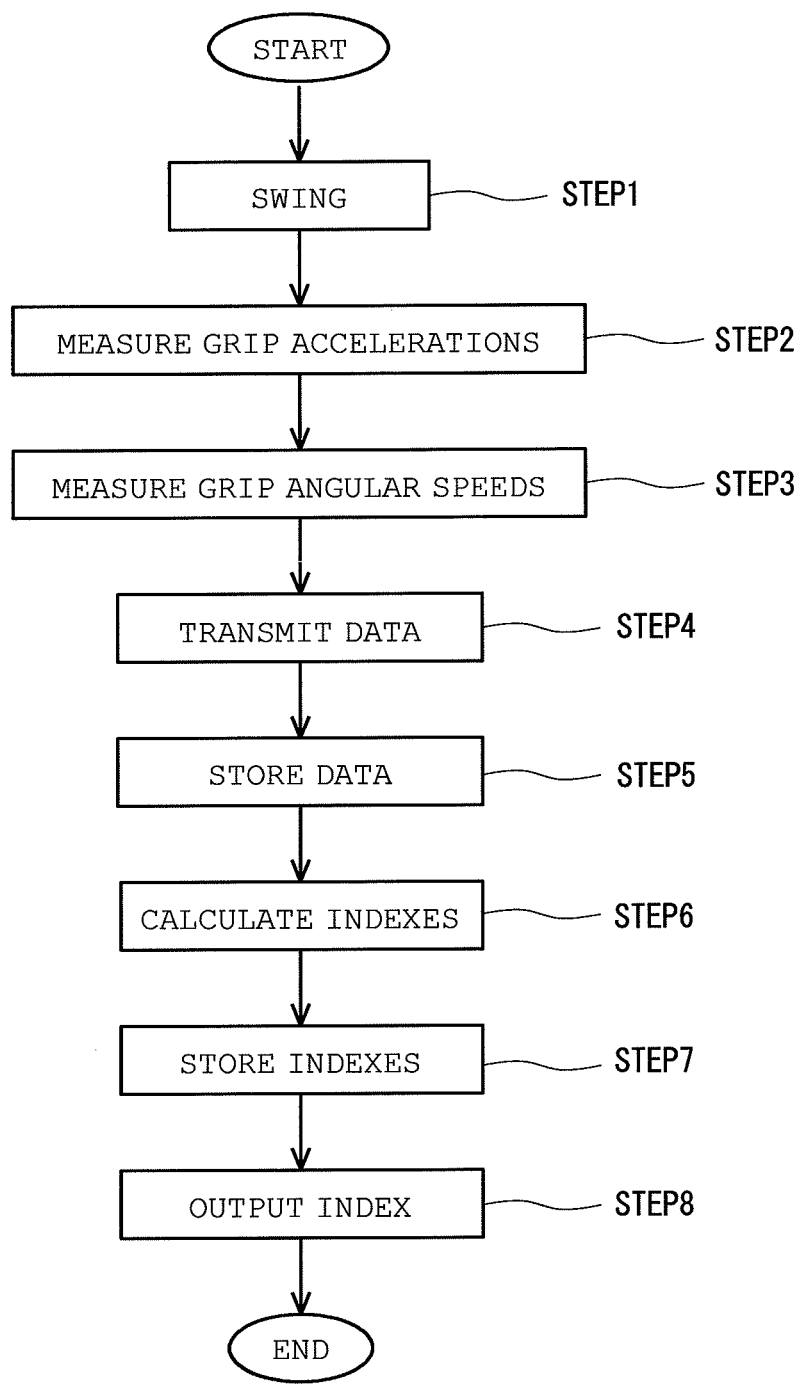
FIG. 4 is a flowchart showing an example of the swing analysis method using the apparatus in FIG. 1.

FIG. 4 is a flowchart showing an example of the swing analysis method using the apparatus in FIG. 1. In this method, the player 48 swings the racket 12 (STEP 1). The swing is not a so-called practice swing. The player 48 hits a tennis ball with the swing. Tennis balls to be hit are supplied into the own side 50 for the player 48. Tennis balls are preferably supplied in a given direction and at a given speed by using a ball supply device. The player 48 tries to return tennis balls to the opponent's side 52. If a hit tennis ball does not enter the opponent's side 52, the swing is not subjected to later analysis. Even when a hit tennis ball enters the opponent's side 52, if the shot is obviously a missed shot, the swing is not subjected to later analysis.

During a swing, the three-axis acceleration sensor 28 measures grip accelerations A(gx), A(gy), and A(gz) in the relative x-axis direction, the relative y-axis direction, and the relative z-axis direction at each time point (STEP 2). At the same time, the three-axis gyro sensor 30 measures grip angular speeds ω(gx), ω(gy), and ω(gz) about the relative x-axis, the relative y-axis, and the relative z-axis at each time point (STEP 3). Data of the grip accelerations A(gx), A(gy), and A(gz) and the grip angular speeds ω(gx), ω(gy), and ω(gz) is transmitted from the transmitting section 6 to the receiving section 38 of the analyzing device 8 moment by moment (STEP 4). The calculation section 40 causes the storage section 42 to store these data therein (STEP 5).

The calculation section 40 calculates indexes of the swing by using all or a part of the data of the grip accelerations A(gx), A(gy), and A(gz) and the grip angular speeds ω(gx), ω(gy), and ω(gz) (STEP 6). Examples of the indexes include a grip speed, a head speed, a head speed component ratio, a swing trajectory, and a racket angular speed. The calculation section 40 causes the storage section 42 to store data of the obtained indexes therein (STEP 7). Further, the calculation section 40 outputs a predetermined index to the output section 10 on the basis of designation from the input section 44 (STEP 8). The output result is subjected to a determination as to whether or not the racket 12 is suitable to the player 48.

As described above, the data of the grip accelerations A(gx), A(gy), and A(gz) and the grip angular speeds ω(gx), ω(gy), and ω(gz) is obtained at each time point. For example, the data is obtained every 1/500 sec. From among these data, data at a time which is suitable for determining matching between the player 48 and the racket 12 is selected. An example of the time which is suitable for determining matching is a time at which the head speed is at its maximum. After the start of the swing, the head speed gradually increases. Due to the impact against the tennis ball, the speed of the head 14 rapidly decreases. A time immediately before this decrease in speed occurs is the time at which the head speed is at its maximum.

The following will describe a specific example of a method for calculating each index.

[Grip Speed]

A grip speed is calculated on the basis of the data of the grip accelerations A(gx), A(gy), and A(gz) at each time point in the relative coordinate axes x, y, and z and the data of the grip angular speeds ω(gx), ω(gy), and ω(gz) at each time point about the relative coordinate axes x, y, and z. The grip accelerations A(gx), A(gy), and A(gz) are converted by the calculation section 40 into grip accelerations AA(gx), AA(gy), and AA(gz) at each time point in the absolute coordinate axes x, y, and z. A quaternion used for the conversion is represented by the following mathematical equations.

$$Q=[\cos(\theta);\ \omega(gx)/\theta*\sin(\theta/2),\ \omega(gy)/\theta*\sin(\theta/2),\ \omega(gz)/\theta*\sin(\theta/2)]$$

$$R=[\cos(\theta);\ -\omega(gx)/\theta*\sin(\theta/2),\ -\omega(gy)/\theta*\sin(\theta/2),\ -\omega(gz)/\theta*\sin(\theta/2)]$$

θ in the above mathematical equations is calculated by the following mathematical equation.

$$\theta=\text{SQRT}(\omega(gx)^2+\omega(gy)^2+\omega(gz)^2)$$

In this conversion, the relative coordinate axes for the grip accelerations A(gx), A(gy), and A(gz) are converted into the absolute coordinate axes on the basis of the grip angular speeds ω(gx), ω(gy), and ω(gz).

Grip speeds V(gx), V(gy), and V(gz) at each time point in the absolute coordinate axes x, y, and z are calculated by the calculation section 40 from the grip accelerations AA(gx), AA(gy), and AA(gz) at each time point in the absolute coordinate axes x, y, and z. The calculation is performed on the basis of the following mathematical equations.

$$V(gx)=AA(gx)*T$$

$$V(gy)=AA(gy)*T$$

$$V(gz)=AA(gz)*T$$

In the above mathematical equations, T is a time.

A grip speed V(g) at each time point is calculated by the calculation section 40 from the grip speeds V(gx), V(gy), and V(gz) at each time point in the absolute coordinate axes x, y, and z. The calculation is performed on the basis of the following mathematical equation.

$$V(g)=\text{SQRT}(V(gx)^2+V(gy)^2+V(gz)^2)$$

The grip speed V(g) at each time point is stored in the storage section 42.

The calculation section 40 selects the maximum grip speed V(g) from among the grip speed V(g) at each time point that is stored in the storage section 42. The calculation section 40 outputs the maximum grip speed V(g) to the output section 10. When the maximum grip speed V(g) is high, it means that the player 48 has less tensed their arm and has less loosened their hand. When the maximum grip speed V(g) is high, it means that the racket 12 matches the player 48. On the basis of the maximum grip speed V(g), it can be determined whether or not the racket 12 is suitable to the player 48.

In fitting, a racket 12 of which the maximum grip speed V(g) is higher than the maximum grip speed V(g) of a reference racket is recommended to the player 48. The reference racket is a racket that is regularly used by the player 48.

A plurality of swings may be taken and a plurality of maximum grip speeds V(g) may be obtained. The average of these maximum grip speeds V(g) is calculated by the calculation section 40. The average is preferably outputted to the output section 10.

[Head Speed]

A head speed is calculated on the basis of the data of the grip accelerations A(gx), A(gy), and A(gz) at each time point in the relative coordinate axes x, y, and z; the data of the grip angular speeds ω(gx), ω(gy), and ω(gz) at each time point about the relative coordinate axes x, y, and z; and the racket length. First, the calculation section 40 calculates a grip speed V(g) at each time point by using the above-described mathematical equations. Meanwhile, the calculation section 40 calculates a rotation matrix RM from the above-described quaternion. Further, the calculation section 40 calculates a speed Vr by rotation on the basis of the following mathematical equation.

$$Vr=\text{cross}(\omega,\ tV)*RM$$

In this mathematical equation, cross(ω, tV) is the cross product of an angular speed vector ω and a racket length vector tV.

Head speeds V(hx), V(hy), and V(hz) at each time point in the absolute coordinate axes x, y, and z are calculated by the calculation section 40 on the basis of the following mathematical equations.

$$V(hx)=V(g)+Vr(x)$$

$$V(hy)=V(g)+Vr(y)$$

$$V(hz)=V(g)+Vr(z)$$

A head speed V(h) at each time point is calculated by the calculation section 40 from the head speeds V(hx), V(hy), and V(hz) at each time point in the absolute coordinate axes x, y, and z. The calculation is performed on the basis of the following mathematical equation.

$$V(h)=\text{SQRT}(V(hx)^2+V(hy)^2+V(hz)^2)$$

The head speed V(h) at each time point is stored in the storage section 42.

The calculation section 40 selects the maximum head speed V(h) from among the head speed V(h) at each time point that is stored in the storage section 42. The calculation section 40 outputs the maximum head speed V(h) to the output section 10. When the maximum head speed V(h) is high, it means that the player 48 has strongly hit the tennis ball. When the maximum head speed V(h) is high, it means that the racket 12 matches the player 48. On the basis of the maximum head speed V(h), it can be determined whether or not the racket 12 is suitable to the player 48.

In this analysis method, the head speed can be calculated on the basis of the grip speed. Thus, the three-axis acceleration sensor 28 and the three-axis gyro sensor 30 do not need to be attached to the head 14.

In fitting, a racket 12 of which the maximum head speed V(h) is higher than the maximum head speed V(h) of a reference racket is recommended to the player 48. The reference racket is a racket that is regularly used by the player 48.

A plurality of swings may be taken and a plurality of maximum head speeds V(h) may be obtained. The average of these maximum grip speeds V(h) is calculated by the calculation section 40. The average is preferably outputted to the output section 10.

[Head Speed Component Ratio]

A head speed component ratio I is calculated on the basis of the data of the grip accelerations A(gx), A(gy), and A(gz) at each time point in the relative coordinate axes x, y, and z; the data of the grip angular speeds ω(gx), ω(gy), and ω(gz) at each time point about the relative coordinate axes x, y, and z; and the racket length. First, head speeds V(hx) and V(hz) at each time point in the absolute coordinate axes x and z are calculated by the above-described mathematical equations. The calculation section 40 calculates the head speed component ratio I on the basis of the following mathematical equation.

$$I = V(hz)/V(hx)$$

The head speed component ratio I correlates with a swing type of the player 48. With a swing in which the absolute value of a head speed component ratio I at a time at which the head speed V(h) is at its maximum is high and this head speed component ratio I is positive, it is easy to provide top spin to a tennis ball. With a swing in which the absolute value of this head speed component ratio I is high and this head speed component ratio I is negative, it is easy to provide slice spin to a tennis ball. With a swing in which the absolute value of this head speed component ratio I is close to zero, it is difficult to provide spin to a tennis ball.

In this analysis method, the head speed component ratio I can be calculated on the basis of the grip speed. Thus, the three-axis acceleration sensor 28 and the three-axis gyro sensor 30 do not need to be attached to the head 14.

Figure 5:
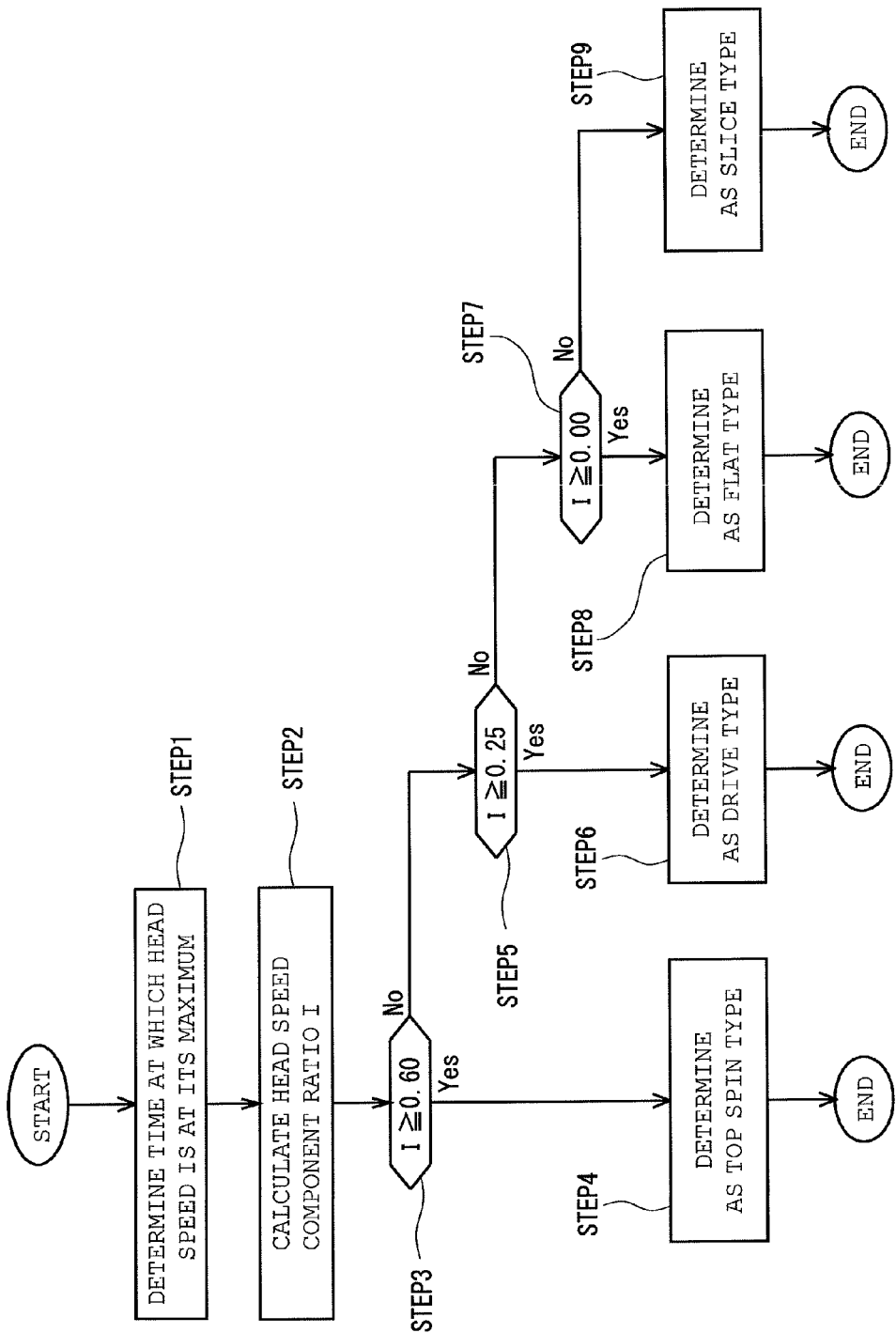
FIG. 5 is a flowchart showing a swing type determination method.

FIG. 5 is a flowchart showing a swing type determination method. This flow is performed by the calculation section 40 shown in FIG. 1. In this flow, the calculation section 40 determines a time at which the head speed V(h) is at its maximum (STEP 1). The calculation section 40 calculates a head speed component ratio I at the time (STEP 2).

The calculation section 40 determines whether or not the head speed component ratio I is equal to or greater than 0.60 (STEP 3). When the head speed component ratio I is equal to or greater than 0.60, the swing is determined as a top spin type (STEP 4). When the head speed component ratio I is not equal to or greater than 0.60, the calculation section 40 determines whether or not the head speed component ratio I is equal to or greater than 0.25 (STEP 5). When the head speed component ratio I is equal to or greater than 0.25, the swing is determined as a drive type (STEP 6). When the head speed component ratio I is not equal to or greater than 0.25, the calculation section 40 determines whether or not the head speed component ratio I is equal to or greater than 0.00 (STEP 7). When the head speed component ratio I is equal to or greater than 0.00, the swing is determined as a flat type (STEP 8). When the head speed component ratio I is not equal to or greater than 0.00, the swing is determined as a slice type (STEP 9).

The result of the determination is outputted to the output section 10. In this analysis method, on the basis of the head speed component ratio I, it can be determined whether or not the racket 12 is suitable to the player 48. The player 48 can select a racket 12 suitable to their own swing type.

A plurality of swings may be taken and a plurality of head speed component ratios I may be obtained. The average of these head speed component ratios I is calculated by the calculation section 40. The average is preferably outputted to the output section 10.

Figure 6:
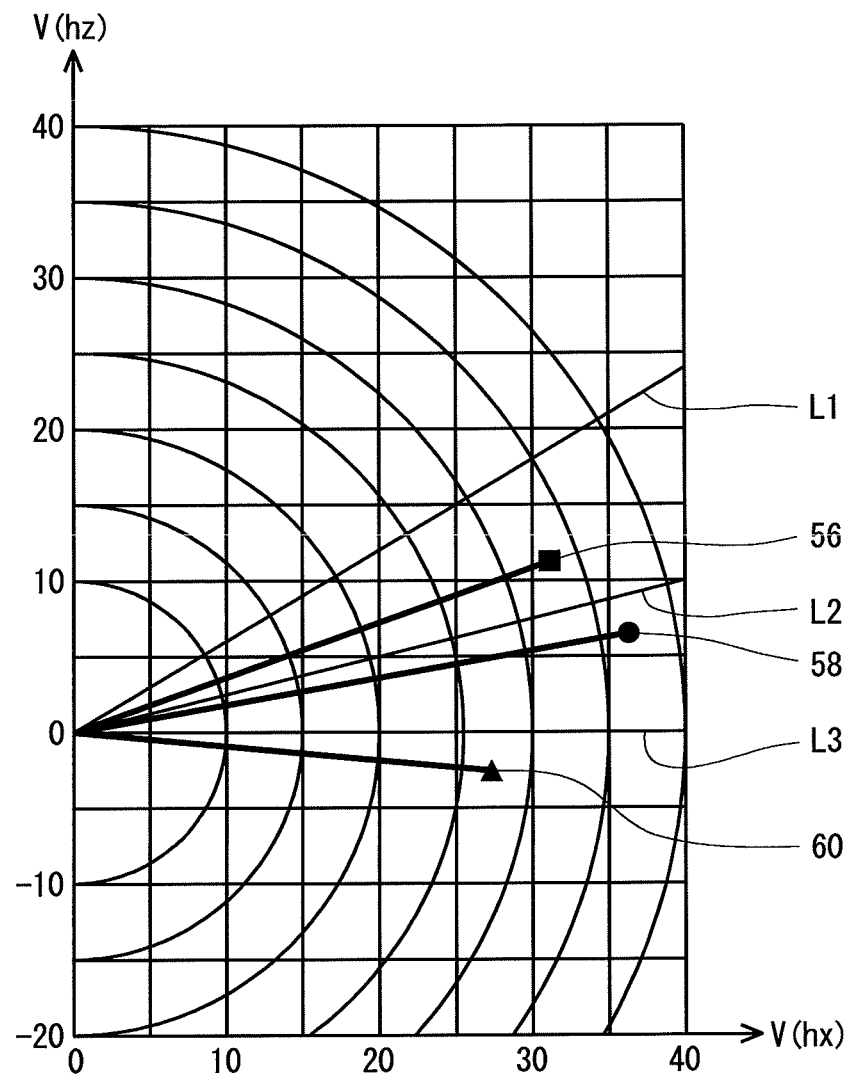
FIG. 6 is a graph outputted to an output section.

FIG. 6 is a graph outputted to the output section 10. In the graph, the horizontal axis indicates a head speed V(hx) in the x-axis direction at the time at which the head speed V(h) is at its maximum. The vertical axis indicates a head speed V(hz) in the z-axis direction at the time at which the head speed V(h) is at its maximum. The distance L from the origin (0, 0) to a point (V(hx), V(hz)) is calculated by the following mathematical equation.

$$L = \mathrm{SQRT}(V(hx)^2 + V(hz)^2)$$

The distance L is a head speed V'(h) when it is postulated that a head speed V(hy) in the y-axis direction is zero. In FIG. 6, many circular arcs are drawn. The center of each circular arc is at the origin (0, 0). The radius of each circular arc indicates a head speed V'(h).

A straight line L1 shown in FIG. 6 is represented by the following mathematical equation.

$$V(hz) = 0.60 * V(hx)$$

A straight line L2 is represented by the following mathematical equation.

$$V(hz) = 0.25 * V(hx)$$

A straight line L3 is represented by the following mathematical equation.

$$V(hz) = 0.00$$

FIG. 6 shows a first point 56, a second point 58, and a third point 60. The first point 56 is indicated by a filled square. The second point 58 is indicated by a filled circle. The third point 60 is indicated by a filled triangle. The first point 56 indicates a point (V(hx), V(hz)) when a first racket is swung. The second point 58 indicates a point (V(hx), V(hz)) when a second racket is swung. The third point 60 indicates a point (V(hx), V(hz)) when a third racket is swung.

The first point 56 is sandwiched between the straight line L1 and the straight line L2. The second point 58 is sandwiched between the straight line L2 and the straight line L3. The third point 60 is located below the straight line L3. The distance from the origin (0, 0) to the second point 58 is larger than the distance from the origin (0, 0) to the first point 56. The distance from the origin (0, 0) to the second point 58 is larger than the distance from the origin (0, 0) to the third point 60.

From FIG. 6, the following becomes clear.
(1) The swing with the first racket is a drive type.
(2) The swing with the second racket is a flat type.
(3) The swing with the third racket is a slice type.

(4) The head speed V'(h) when the second racket is swung is the highest.

On the basis of these information, it can be determined whether or not the racket 12 is suitable to the player 48. On the basis of these information, fitting of the racket 12 is performed.

[Swing Trajectory]

A swing trajectory is calculated on the basis of the data of the grip accelerations A(gx), A(gy), and A(gz) at each time point in the relative coordinate axes x, y, and z; the data of the grip angular speeds ω(gx), ω(gy), and ω(gz) at each time point about the relative coordinate axes x, y, and z; and the racket length. First, on the basis of the above-described mathematical equations, the calculation section 40 calculates grip speeds V(gx), V(gy), and V(gz) at each time point in the absolute coordinate axes x, y, and z. The calculation section 40 calculates grip positions P(gx), P(gy), and P(gz) at each time point, from these grip speeds on the basis of the following mathematical equations.

$$P(gx)=V(gx)*T$$

$$P(gy)=V(gy)*T$$

$$P(gz)=V(gz)*T$$

In the above mathematical equations, T is a time.

The calculation section 40 calculates a relative position P(h) of the top of the head 14 on the basis of the following mathematical equation.

$$P(h)=tV*RM$$

In the above mathematical equation, tV is a racket length vector, and RM is the above-described rotation matrix. The calculation section 40 calculates an absolute coordinate (Xt, Yt, Zt) of the head 14 at each time point on the basis of the following mathematical equation.

$$(Xt,Yt,Zt)=P(g)+P(h)$$

The calculation section 40 calculates a movement distance Jx of the head 14 in the absolute coordinate axis x direction from time to to time t on the basis of the following mathematical equation.

$$Jx=(Xt-Xto)$$

The calculation section 40 calculates a movement distance Jy of the head 14 in the absolute coordinate axis y direction from time to to time t on the basis of the following mathematical equation.

$$Jy=(Yt-Yto)$$

The movement distances Jx and Jy are stored in the storage section 42.

Movement distances Jx and Jy in various time zones can be measured. For example, movement distances Jx and Jy from a time, which is t seconds before impact, to a time of the impact can be measured. Movement distances Jx and Jy from the time of the impact to a time, which is t seconds after the impact, can be measured.

From the movement distances Jx and Jy, the trajectory of the racket 12 becomes clear. On the basis of this trajectory, it can be determined whether or not the racket 12 is suitable to the player 48. A racket 12 which draws an ideal trajectory matches the player 48.

In this analysis method, the trajectory of the head 14 can be calculated on the basis of the grip speed. Thus, the three-axis acceleration sensor 28 and the three-axis gyro sensor 30 do not need to be attached to the head 14.

A plurality of swings may be taken and a plurality of movement distances Jx and a plurality of movement distances Jy may be obtained. The average of these movement distances Jx and the average of these movement distances Jy are calculated by the calculation section 40. The averages are preferably outputted to the output section 10.

[Racket Angular Speed]

A racket angular speed is calculated on the basis of the data of the grip angular speeds ω(gx), ω(gy), and ω(gz) at each time point about the relative coordinate axes x, y, and z. In particular, analysis of the racket angular speed is performed on the basis of the grip angular speed ω(gy) about the relative coordinate axis y.

Figure 7:
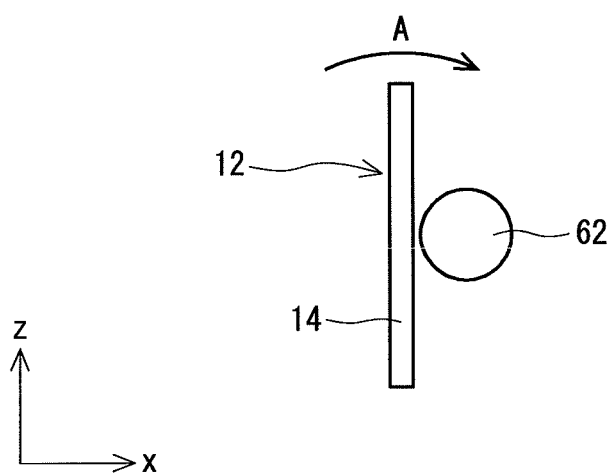
FIG. 7 is a front view showing, with a tennis ball, a tennis racket that is subjected to measurement of a racket angular speed.

FIG. 7 shows a tennis racket 12 subjected to measurement of a racket angular speed. In FIG. 7, the head 14 is shown as viewed along the direction of the relative coordinate axis y. In FIG. 7, a tennis ball 62 is also shown which is immediately before impact against the racket 12. What is indicated by an arrow A in FIG. 7 is a rotation direction of the head 14. An angular speed of this rotation is the above-described grip angular speed ω(gy). The grip angular speed ω(gy) is outputted by the calculation section 40 to the output section 10.

When the grip angular speed ω(gy) is a positive value, it means that the swing type is a swing type in which the tennis ball 62 is hit with the face 24 closed. When the grip angular speed ω(gy) is a negative value, it means that the swing type is a swing type in which the tennis ball 62 is hit with the face 24 opened. The player 48 can select a racket 12 suitable to their own swing type.

A plurality of swings may be taken and a plurality of grip angular speeds ω(gy) may be obtained. The average of these grip angular speeds ω(gy) is calculated by the calculation section 40. The average is preferably outputted to the output section 10.

The above descriptions are merely for illustrative examples, and various modifications can be made without departing from the principles of the present invention.

What is claimed is:

1. A tennis swing analyzing apparatus comprising:
a three-axis acceleration sensor attached to a tennis racket including a grip and a head, for measuring accelerations in directions of three axes when a swing for hitting a tennis ball is taken with the tennis racket;
a three-axis gyro sensor attached to the tennis racket, for measuring angular speeds about the three axes when the swing for hitting is taken; and
an analyzing device, wherein:
the three-axis acceleration sensor and the three-axis gyro sensor are both attached to the grip of the tennis racket,
the analyzing device has:
a receiving function to receive data regarding the accelerations and the angular speeds from the three-axis acceleration sensor and the three-axis gyro sensor;
a coordinate axis conversion function to convert relative coordinate axes that are the three axes for the accelerations into absolute coordinate axes on the basis of the angular speeds; and
a calculation function to calculate an index of the swing, the index including a grip speed and a head speed, the grip speed being calculated on the basis of accelerations resulting from the coordinate axis conversion and time, the head speed being calculated on the basis of the grip speed and a speed by rotation which is calculated on the basis of a racket length and a rotation matrix.

2. The analyzing apparatus according to claim 1, wherein the index further includes a head speed component ratio, or a swing trajectory.

3. The analyzing apparatus according to claim 2, wherein the index is the grip speed, the head speed, or the head speed component ratio immediately before an impact of the tennis racket against the tennis ball.

4. The analyzing apparatus according to claim 2, wherein
the three-axis acceleration sensor and the three-axis gyro sensor are attached to an end of the grip, and
the analyzing device further has:
a calculation function to calculate the head speed component ratio, or the swing trajectory on the basis of the grip speed.

5. A tennis swing analysis method comprising the steps of:
measuring accelerations in directions of three axes by a three-axis acceleration sensor and measuring angular speeds about the three axes by a three-axis gyro sensor when a swing for hitting a tennis ball is taken with a tennis racket that includes a grip and a head, the three-axis acceleration sensor and the three-axis gyro sensor are both attached to the grip of the tennis racket;
converting relative coordinate axes that are the three axes for the accelerations into absolute coordinate axes on the basis of the angular speeds; and
calculating an index of the swing by an analyzing device, the index including a grip speed and a head speed, the grip speed being calculated on the basis of accelerations resulting from the coordinate axis conversion and time, the head speed being calculated on the basis of the grip speed and a speed by rotation which is calculated on the basis of a racket length and a rotation matrix.

6. The analysis method according to claim 5, wherein the index further includes a head speed component ratio, or a swing trajectory.

7. The analysis method according to claim 6, wherein the index is the grip speed, the head speed, or the head speed component ratio immediately before an impact of the tennis racket against the tennis ball.

8. The analysis method according to claim 6, further comprising the step of calculating the head speed component ratio, or the swing trajectory on the basis of the grip speed.

9. A method for fitting a tennis racket by using an analysis method according to claim 5, the method comprising the step of:
determining suitability of the tennis racket on the basis of the index.

10. A method for fitting a tennis racket by using an analysis method according to claim 5, the method comprising the step of:
displaying, on a display section, a graph in which a vertical axis indicates a head speed component and a horizontal axis indicates another head speed component.

11. A method for fitting a tennis racket by using an analysis method according to claim 5, the method comprising the step of:
categorizing a swing type on the basis of a head speed component ratio.

12. The analyzing apparatus according to claim 1, wherein the tennis racket further includes a face and a shaft, the index further includes a head speed component ratio, and the head speed component ratio is calculated on the basis of a head speed component parallel to the face and a head speed component perpendicular to the face.

13. The analysis method according to claim 5, the tennis racket further includes a face and a shaft, the index further includes a head speed component ratio, and the head speed component ratio is calculated on the basis of a head speed component parallel to the face and a head speed component perpendicular to the face.

* * * * *